US007683936B2

(12) United States Patent
Uenaka

(10) Patent No.: US 7,683,936 B2
(45) Date of Patent: Mar. 23, 2010

(54) ANGULAR VELOCITY DETECTION APPARATUS

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 336 days.

(21) Appl. No.: 11/869,035

(22) Filed: Oct. 9, 2007

(65) Prior Publication Data

US 2008/0084479 A1   Apr. 10, 2008

(30) Foreign Application Priority Data

Oct. 10, 2006   (JP)   ............................. 2006-276563

(51) Int. Cl.
*H04N 5/228* (2006.01)
*G03B 17/00* (2006.01)

(52) U.S. Cl. .............. 348/208.5; 348/208.1; 348/208.4; 396/52; 396/55

(58) Field of Classification Search ............ 348/208.99, 348/208.1–208.6, 208.11, 208.13; 396/52–54
See application file for complete search history.

(56) References Cited

U.S. PATENT DOCUMENTS

| | | | | |
|---|---|---|---|---|
| 5,852,750 | A * | 12/1998 | Kai et al. ....................... | 396/55 |
| 5,867,213 | A * | 2/1999 | Ouchi ....................... | 348/208.5 |
| 6,263,162 | B1 | 7/2001 | Yamazaki et al. | |
| 6,456,789 | B1 | 9/2002 | Uenaka | |
| 6,630,950 | B1 * | 10/2003 | Ohkawara et al. ....... | 348/208.12 |
| 6,654,554 | B2 | 11/2003 | Uenaka | |
| 6,781,622 | B1 * | 8/2004 | Sato et al. ................ | 348/208.4 |
| 7,528,862 | B2 * | 5/2009 | Uenaka et al. ......... | 348/208.11 |
| 2005/0190267 | A1 | 9/2005 | Uenaka et al. | |
| 2005/0200712 | A1 | 9/2005 | Uenaka | |
| 2007/0269195 | A1 | 11/2007 | Uenaka | |

FOREIGN PATENT DOCUMENTS

| | | |
|---|---|---|
| JP | 9-080552 | 3/1997 |
| JP | 2000-321612 | 11/2000 |
| JP | 2001-159767 | 6/2001 |

* cited by examiner

*Primary Examiner*—Luong T Nguyen
(74) *Attorney, Agent, or Firm*—Greenblum & Bernstein, P.L.C.

(57) ABSTRACT

An angular-velocity detector includes a first sensor, a second sensor, and a controller. The first sensor is used for detecting motion around an axis of a second direction perpendicular to a first direction. The second sensor is used for detecting motion around an axis of the first direction. The controller performs an operation that corrects an output error caused by an angle of inclination of the second sensor by using a first correction coefficient that is a ratio of a second amplitude to a first amplitude. The first amplitude is amplitude of output value from the first sensor when the angular-velocity detector is in first motion around an axis of the second direction without second motion around an axis of the first direction. The second amplitude is amplitude of output value from the second sensor when the angular-velocity detector is in the first motion without the second motion.

4 Claims, 8 Drawing Sheets

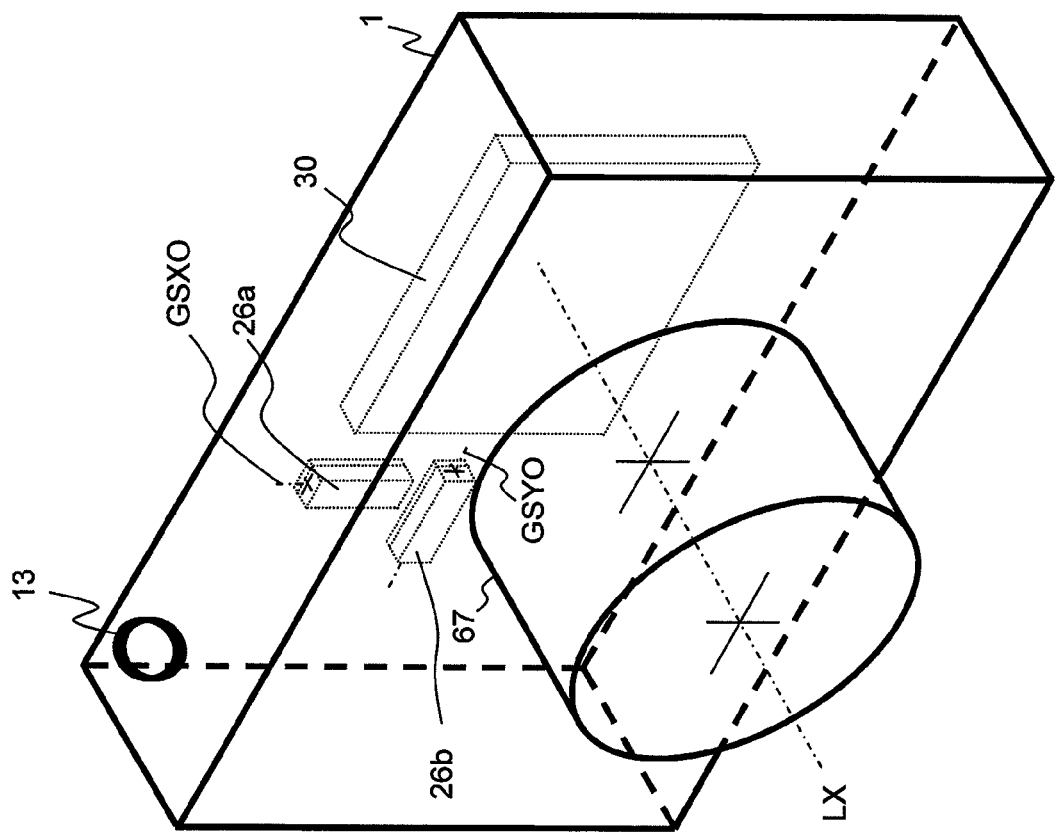
Fig. 8
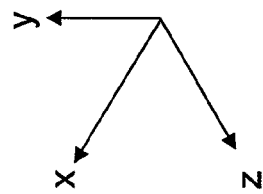

ANGULAR VELOCITY DETECTION APPARATUS

BACKGROUND OF THE INVENTION

1. Field of the Invention

The present invention relates to an angular velocity detection apparatus, and in particular to the modification of an output error caused by an undesired angle of inclination resulting from the imperfect alignment, during installation, of the angular velocity sensor for the anti-shake operation etc.

2. Description of the Related Art

An anti-shake apparatus for a photographing apparatus is proposed. The anti-shake apparatus corrects for hand-shake effects by moving either a hand-shake correcting lens that is a part of the photographing optical system, or an imaging device, on a plane that is perpendicular to the optical axis of the photographing optical system, in a manner corresponding to the amount of hand-shake that occurs during the imaging process.

Japanese unexamined patent publication (KOKAI) No. H09-80552 discloses an anti-shake apparatus that reduces noise and improves the precision of the hand-shake quantity by mounting an angular velocity sensor and an amplifier for the output signal from the angular velocity sensor on the same circuit board, to shorten the distance between the angular velocity sensor and the amplifier.

However, the output error caused by the undesired angle of the inclination resulting from the imperfect alignment, during installation, of the angular velocity sensor for the anti-shake operation is not considered.

SUMMARY OF THE INVENTION

Therefore, an object of the present invention is to provide an angular velocity detection apparatus that corrects the output error caused by the undesired angle of inclination of the angular velocity sensor.

According to the present invention, an anti-shake apparatus for image stabilizing comprises a first angular velocity sensor, a second angular velocity sensor, and a controller. The first angular velocity sensor is used for detecting a motion around an axis of a second direction. The second direction is perpendicular to a first direction and an optical axis of a photographing optical system. The first direction is perpendicular to the optical axis. The second angular velocity sensor is used for detecting a motion around an axis of the first direction. The controller controls the first and second angular velocity sensors, performs an anti-shake operation based on an output signal from the first angular velocity sensor and an output signal from the second angular velocity sensor, and performs a first angular error correction processing operation and a second angular error correction processing operation in the anti-shake operation. In the second angular error correction processing operation, an output error caused by an angle of inclination of the second angular velocity sensor is corrected by using a first correction coefficient that is a ratio of a second amplitude to a first amplitude. In the first angular error correction processing operation, an output error caused by an angle of inclination of the first angular velocity sensor is corrected by using a second correction coefficient that is a ratio of a third amplitude to a fourth amplitude. The first amplitude is an amplitude of an output value from the first angular velocity sensor when the anti-shake apparatus is in a first motion around an axis of the second direction, but is not in a second motion around an axis of the first direction. The second amplitude is an amplitude of an output value from the second angular velocity sensor when the anti-shake apparatus is in the first motion, but is not in the second motion. The third amplitude is an amplitude of an output value from the first angular velocity sensor when the anti-shake apparatus is in the second motion, but is not in the first motion. The fourth amplitude is an amplitude of an output value from the second angular velocity sensor when the anti-shake apparatus is in the second motion, but is not in the first motion.

BRIEF DESCRIPTION OF THE DRAWINGS

The objects and advantages of the present invention will be better understood from the following description, with reference to the accompanying drawings in which:

FIG. 8 is a perspective front view of the photographing apparatus that shows a detection axis of the first angular velocity sensor and a detection axis of the second angular velocity sensor.

DESCRIPTION OF THE PREFERRED EMBODIMENTS

Figure 1:
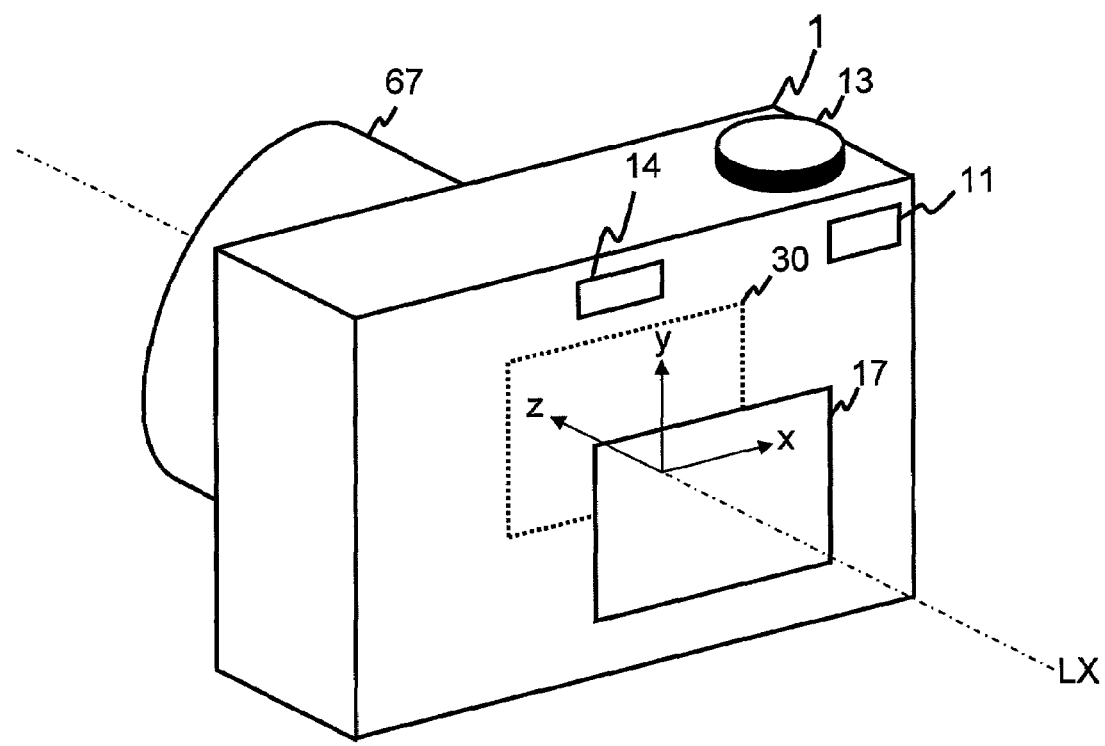
FIG. 1 is a perspective rear view of the embodiment of the photographing apparatus viewed from the back side.

The present invention is described below with reference to the embodiment shown in the drawings. In the embodiment, the photographing apparatus 1 is a digital camera. A photographing optical system, such as a camera lens 67 etc. that captures (images) an optical image on a photographing surface of the imaging device of the photographing apparatus 1, has an optical axis LX.

In order to explain the direction in the embodiment, a first direction x, a second direction y, and a third direction z are defined (see FIG. 1). The first direction x is perpendicular to the optical axis LX. The second direction y is perpendicular to the optical axis LX and the first direction x. The third direction z is parallel to the optical axis LX and perpendicular to both the first direction x and the second direction y.

Figure 2:
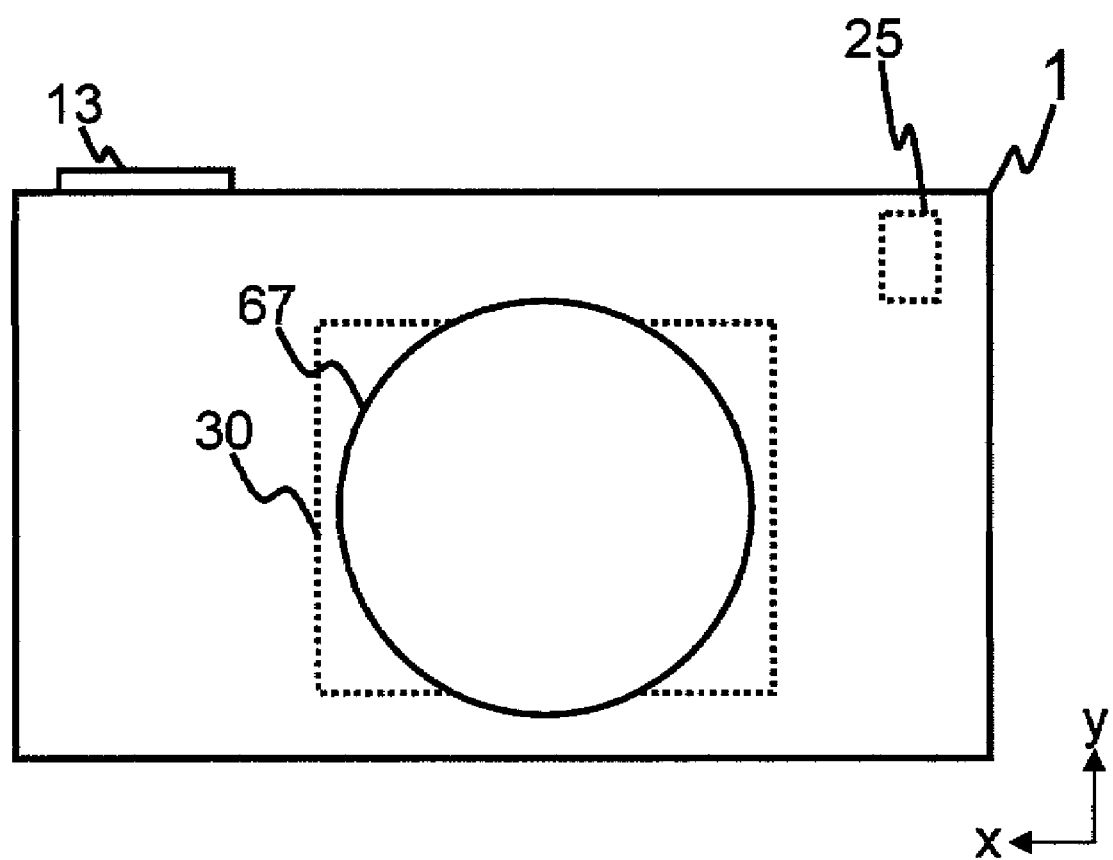
FIG. 2 is a front view of the photographing apparatus.
Figure 3:
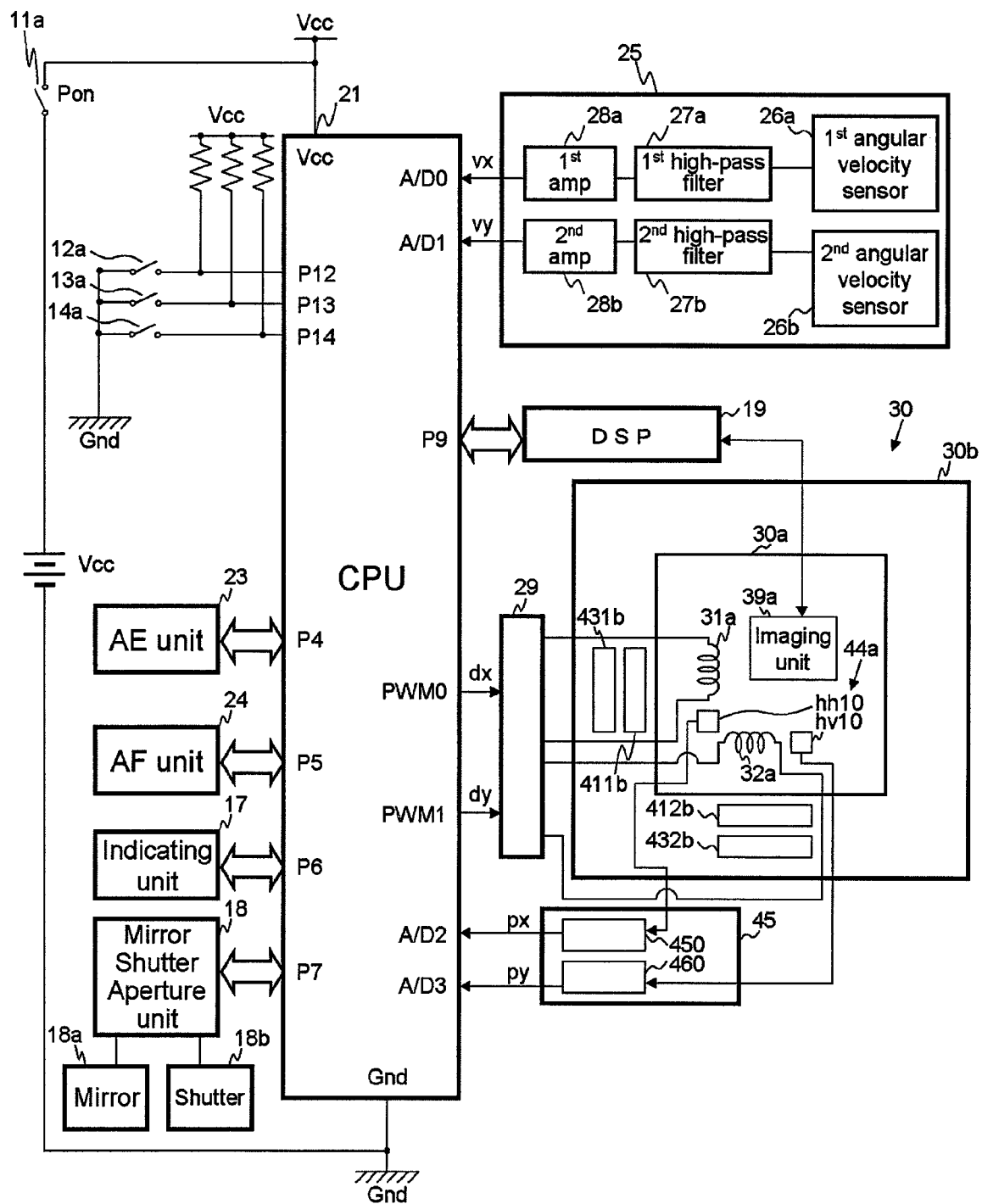
FIG. 3 is a circuit construction diagram of the photographing apparatus.

The imaging part of the photographing apparatus 1 comprises a PON button 11, a PON switch 11a, a photometric switch 12a, a release button 13, a release switch 13a, an anti-shake button 14, an anti-shake switch 14a, an indicating unit 17 such as an LCD monitor etc., a mirror-aperture-shutter unit 18, a DSP 19, a CPU 21, an AE (automatic exposure) unit 23, an AF (automatic focus) unit 24, an imaging unit 39a in the anti-shake unit 30, and a camera lens 67 (see FIGS. 1, 2, and 3).

Whether the PON switch 11a is in the ON state or the OFF state, is determined by the state of the PON button 11, so that the ON/OFF states of the photographing apparatus 1 correspond to the ON/OFF states of the PON switch 11a.

The photographic subject image is captured as an optical image through the camera lens 67 by the imaging unit 39a, and the captured image is displayed on the indicating unit 17. The photographic subject image can be optically observed by the optical finder (not depicted).

When the release button 13 is partially depressed by the operator, the photometric switch 12a changes to the ON state so that the photometric operation, the AF sensing operation, and the focusing operation are performed.

When the release button 13 is fully depressed by the operator, the release switch 13a changes to the ON state so that the imaging operation by the imaging unit 39a (the imaging apparatus) is performed, and the image, which is captured, is stored.

In the embodiment, the anti-shake operation is performed from the point when the release switch 13a is set to the ON state, to the point when the release sequence operation (the photographing operation) is finished. However, the anti-shake operation may be also performed for during the photometric operation, the AF sensing operation, and the focusing operation.

The mirror-aperture-shutter unit 18 is connected to port P7 of the CPU 21 and performs an UP/DOWN operation of a mirror 18a (a mirror-up operation and a mirror-down operation), an OPEN/CLOSE operation of the aperture, and an OPEN/CLOSE operation of a shutter 18b corresponding to the ON state of the release switch 13a.

While the mirror-up operation of the mirror 18a is being performed, or while the mirror up switch (not depicted) is set to the ON state so that the movement of the front curtain of the shutter 18b is being performed, a front curtain movement signal (not depicted) is set to the ON state.

The DSP 19 is connected to port P9 of the CPU 21, and it is connected to the imaging unit 39a. Based on a command from the CPU 21, the DSP 19 performs the calculation operations, such as the image processing operation etc., on the image signal obtained by the imaging operation of the imaging unit 39a.

The CPU 21 is a control apparatus that controls each part of the photographing apparatus 1 regarding the imaging operation and the anti-shake operation (i.e. the image stabilizing operation). The anti-shake operation includes both the movement of the movable unit 30a and position-detection efforts.

Further, the CPU 21 stores a value of the anti-shake parameter IS that determines whether the photographing apparatus 1 is in the anti-shake mode or not, a value of a release time counter RLST, and a value of a release state parameter RP.

The value of the release state parameter RP changes with respect to the release sequence operation. When the release sequence operation is performed, the value of the release state parameter RP is set to 1 (see steps S21 to S29 in FIG. 4), and when the release sequence operation is finished, the value of the release state parameter RP is set (reset) to 0 (see steps S13 and S29 in FIG. 4).

The CPU 21 performs the release sequence operation after the release switch 13a is set to the ON state.

Further, the CPU 21 stores values of a first before-error-correction digital angular velocity signal $BVx_n$, a second before-error-correction digital angular velocity signal $BVy_n$, a first digital angular velocity signal $Vx_n$, a second digital angular velocity signal $Vy_n$, a first digital angular velocity $VVx_n$, a second digital angular velocity $VVy_n$, a digital displacement angle $Bx_n$, a second digital displacement angle $By_n$, a coordinate of position $S_n$ in the first direction x: $Sx_n$, a coordinate of position $S_n$ in the second direction y: $Sy_n$, a first driving force $Dx_n$, a second driving force $Dy_n$, a coordinate of position $P_n$ after A/D conversion in the first direction x: $pdx_n$, a coordinate of position $P_n$ after A/D conversion in the second direction y: $pdy_n$, a first subtraction value $ex_n$, a second subtraction value $ey_n$, a first proportional coefficient Kx, a second proportional coefficient Ky, a sampling cycle θ of the anti-shake operation, a first integral coefficient Tix, a second integral coefficient Tiy, a first differential coefficient Tdx, a second differential coefficient Tdy, a first before-correction value TMPX, a second before-correction value TMPY, a first correction coefficient CX, and a second correction coefficient CY.

In the embodiment, the first digital angular velocity signal $Vx_n$ is calculated by performing a first angular error correction processing operation on the first before-error-correction digital angular velocity signal $BVx_n$ that is based on the first angular velocity vx.

Figure 7:
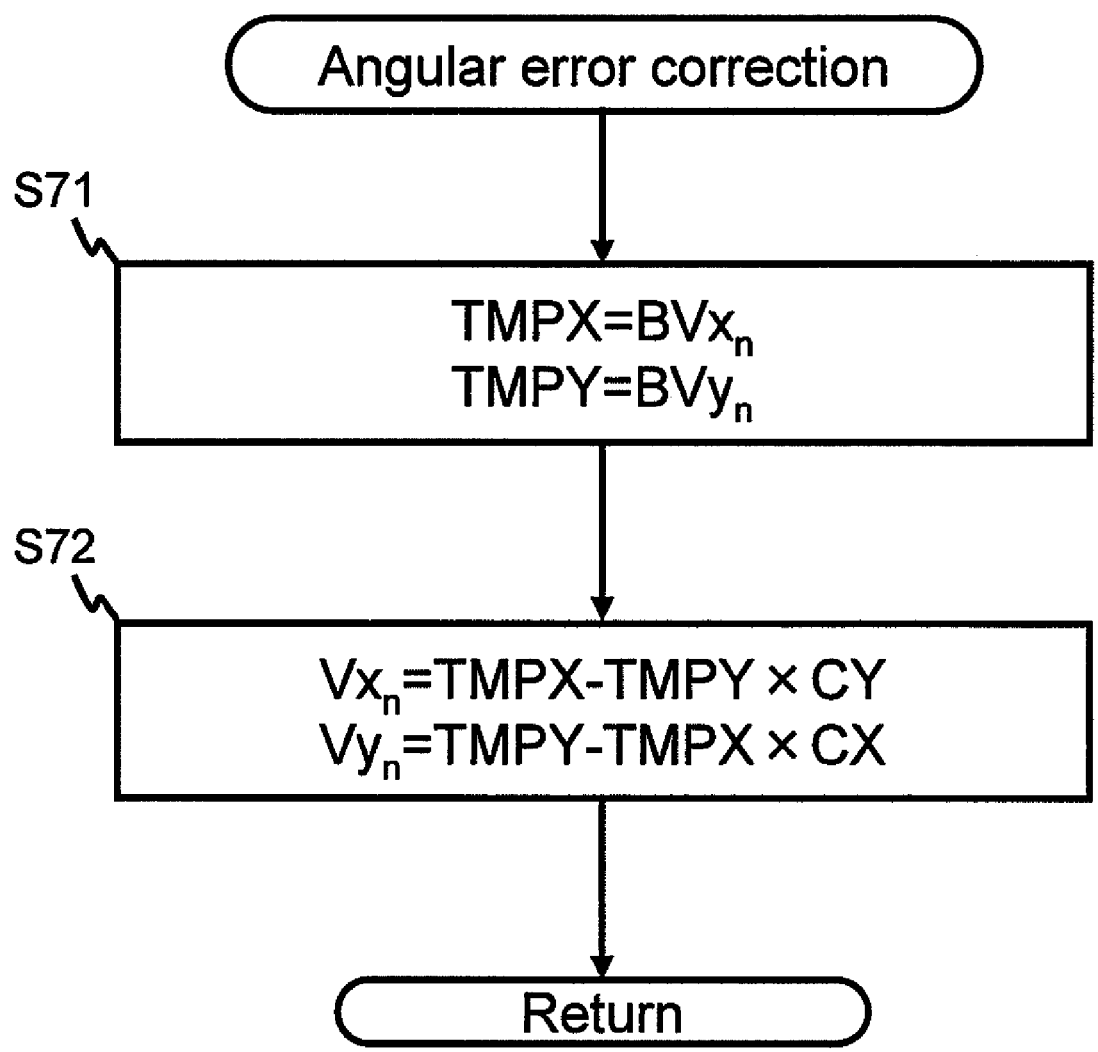
FIG. 7 is a flowchart that shows the detail of the first and second angular error correction processing operations.

In the first angular error correction processing operation, an output error caused by an undesired angle of the inclination resulting from the imperfect alignment, during installation, of the first angular velocity sensor 26a is corrected by using the first before-error-correction digital angular velocity signal $BVx_n$, the second before-error-correction digital angular velocity signal $BVy_n$, the second before-correction value TMPY, and the second correction coefficient CY($Vx_n$=$BVx_n$−$BVy_n$×CY, see step S72 in FIG. 7).

The inclination, from imperfect installation, of the first angular velocity sensor 26a is indicated by an angle between a detection axis GSXO of the first angular velocity sensor 26a and the second direction y.

Similarly, the second digital angular velocity signal $Vy_n$ is calculated by performing a second angular error correction processing operation on the second before-error-correction digital angular velocity signal $BVy_n$, that is based on the second angular velocity vy.

In the second angular error correction processing operation, an output error based caused by an undesired angle of inclination resulting from the imperfect alignment, during installation, of the second angular velocity sensor 26b, is corrected, by using the first before-error-correction digital angular velocity signal $BVx_n$, the second before-error-correction digital angular velocity signal $BVy_n$, the first before-correction value TMPX, and the first correction coefficient CX($Vy_n$=$BVy_n$−$BVx_n$×CX, see step S72 in FIG. 7).

The inclination, from imperfect installation, of the second angular velocity sensor 26b is indicated by an angle between a detection axis GSYO of the second angular velocity sensor 26b and the first direction x.

The first correction coefficient CX is a ratio of a second amplitude Y1 to a first amplitude X1(CX=Y1/X1), and is calculated in advance by an experiment etc.

The first amplitude X1 is an amplitude of the output value from the first angular velocity sensor 26a when the photographing apparatus 1 is in a first rotary (swinging) motion (the yawing motion) around the axis of the second direction y, but is not in a second rotary (swinging) motion (the pitching motion) around the axis of the first direction x.

The second amplitude Y1 is an amplitude of the output value from the second angular velocity sensor 26b when the photographing apparatus 1 is in the first rotary (swinging) motion (the yawing motion) around the axis of the second direction y, but is not in the second rotary (swinging) motion (the pitching motion) around the axis of the first direction x.

The second correction coefficient CY is a ratio of a third amplitude X2 to a fourth amplitude Y2(CY=X2/Y2), and is calculated in advance by an experiment etc.

The third amplitude X2 is an amplitude of the output value from the first angular velocity sensor 26a when the photographing apparatus 1 is in the second rotary (swinging) motion (the pitching motion) around the axis of the first direction x, but is not in the first rotary (swinging) motion (the yawing motion) around the axis of the second direction y.

The fourth amplitude Y2 is an amplitude of the output value from the second angular velocity sensor 26b when the photographing apparatus 1 is in the second rotary (swinging) motion (the pitching motion) around the axis of the first direction x, but is not in the first rotary (swinging) motion (the yawing motion) around the axis of the second direction y.

It is desirable (ideal) to have the first angular velocity sensor 26a installed so that the detection axis GSXO of the first angular velocity sensor 26a is perpendicular to a detection direction (the first direction x). In other words, it is desirable (ideal) that an angle between the detection axis GSXO of the first angular velocity sensor 26a and the second direction y is 0

It is desirable (ideal) to have the second angular velocity sensor 26b installed so that the detection axis GSYO of the second angular velocity sensor 26b is perpendicular to a detection direction (the second direction y). In other words, it is desirable (ideal) that an angle between the detection axis GSYO of the second angular velocity sensor 26b and the first direction x is 0.

In this desirable case, when the photographing apparatus 1 is in the yawing motion but not in the pitching motion, the output value from the second angular velocity sensor 26b is 0. Similarly, when the photographing apparatus 1 is in the pitching motion but not in the yawing motion, the output value from the first angular velocity sensor 26a is 0.

However, the installation process makes the desirable case difficult (the angle between the detection axis GSXO of the first angular velocity sensor 26a and the second direction y is 0, and the angle between the detection axis GSYO of the second angular velocity sensor 26b and the first direction x is 0) because of the inclination of the detection elements of the first and second angular velocity sensors 26a and 26b, the inclinations resulting from imperfect installation of the first and second angular velocity sensors 26a and 26b, and the inclination from the installation of the circuit board to which the first and second angular velocity sensors 26a and 26b are attached to the main circuit board etc (see FIG. 8).

Accordingly, when the photographing apparatus 1 is in the yawing motion but not in the pitching motion, the output value from the second angular velocity sensor 26b is not equal to 0. In other words, the output error caused by the undesired angle of inclination resulting from imperfect alignment during installation etc., can not be completely removed.

Similarly, when the photographing apparatus 1 is in the pitching motion but not in the yawing motion, the output value from the first angular velocity sensor 26a is not equal to 0. In other words, the output error caused by the undesired angle of inclination resulting from imperfect alignment during installation etc., can not be completely removed.

In the embodiment, the output error of the output signal from the first angular velocity sensor 26a is calculated on the basis of the inclination ($BVy_n \times CY$), and the first angular error correction processing operation is performed. Similarly, the output error of the output signal from the second angular velocity sensor 26b is calculated on the basis of the inclination ($BVx_n \times CX$), and the second angular error correction processing operation is performed.

Accordingly, a highly accurate detection of the hand-shake quantity can be performed, even if the first and second angular velocity sensors 26a and 26b are installed at undesired angles of inclination.

The AE unit (an exposure calculating unit) 23 performs the photometric operation and calculates the photometric values, based on the subject being photographed. The AE unit 23 also calculates the aperture value and the time length of the exposure, with respect to the photometric values, both of which are needed for imaging. The AF unit 24 performs the AF sensing operation and the corresponding focusing operation, both of which are needed for imaging. In the focusing operation, the camera lens 67 is re-positioned along the optical axis in the LX direction.

The anti-shake part (the anti-shake apparatus) of the photographing apparatus 1 comprises an anti-shake button 14, an anti-shake switch 14a, an indicating unit 17, a CPU 21, an angular velocity detection unit 25, a driver circuit 29, an anti-shake unit 30, a hall-element signal-processing unit 45 (a magnetic-field change-detecting element), and the camera lens 67.

When the anti-shake button 14 is depressed by the operator, the anti-shake switch 14a is changed to the ON state so that the anti-shake operation, in which the angular velocity detection unit 25 and the anti-shake unit 30 are driven independently of the other operations which include the photometric operation etc., is carried out at the predetermined time interval. When the anti-shake switch 14a is in the ON state, in other words in the anti-shake mode, the anti-shake parameter IS is set to 1 (IS=1). When the anti-shake switch 14a is not in the ON state, in other words in the non-anti-shake mode, the anti-shake parameter IS is set to 0 (IS=0). In the embodiment, the value of the predetermined time interval is set to 1 ms.

The various output commands corresponding to the input signals of these switches are controlled by the CPU 21.

The information regarding whether the photometric switch 12a is in the ON state or OFF state is input to port P12 of the CPU 21 as a 1-bit digital signal. The information regarding whether the release switch 13a is in the ON state or OFF state is input to port P13 of the CPU 21 as a 1-bit digital signal. The information regarding whether the anti-shake switch 14a is in the ON state or OFF state is input to port P14 of the CPU 21 as a 1-bit digital signal.

The AE unit 23 is connected to port P4 of the CPU 21 for inputting and outputting signals. The AF unit 24 is connected to port P5 of the CPU 21 for inputting and outputting signals. The indicating unit 17 is connected to port P6 of the CPU 21 for inputting and outputting signals.

Next, the details of the input and output relationships between the CPU 21 and the angular velocity detection unit 25, the driver circuit 29, the anti-shake unit 30, and the hall-element signal-processing unit 45 are explained.

The angular velocity detection unit 25 has a first angular velocity sensor 26a, a first high-pass filter circuit 27a, a second high-pass filter circuit 27b, a first amplifier 28a and a second amplifier 28b.

The first angular velocity sensor 26a is used for detecting the angular velocity of a rotary (swinging) motion (the yawing motion) of the photographing apparatus 1 around the axis of the second direction y (the velocity-component in the first direction x of the angular velocity of the photographing apparatus 1). The first angular velocity sensor 26a is a gyro sensor that is used for detecting a yawing angular velocity.

The second angular velocity sensor 26b is used for detecting the angular velocity of a rotary (swinging) motion (the pitching motion) of the photographing apparatus 1 around the axis of the first direction x (the velocity-component in the second direction y of the angular velocity of the photographing apparatus 1). The second angular velocity sensor 26b is a gyro sensor that is used for detecting a pitching angular velocity.

The first high-pass filter circuit 27a reduces a low-frequency component of the signal output from the first angular velocity sensor 26a, because the low-frequency component of the signal output from the first angular velocity sensor 26a includes signal elements that are based on a null voltage and a panning-motion, neither of which are related to hand-shake.

The second high-pass filter circuit 27b reduces a low-frequency component of the signal output from the second angular velocity sensor 26b, because the low-frequency component of the signal output from the second angular velocity sensor 26b includes signal elements that are based on a null voltage and a panning-motion, neither of which are related to hand-shake.

The first amplifier 28a amplifies a signal regarding the yawing angular velocity, whose low-frequency component has been reduced, and outputs the analog signal to the A/D converter A/D 0 of the CPU 21 as a first angular velocity vx.

The second amplifier 28b amplifies a signal regarding the pitching angular velocity, whose low-frequency component has been reduced, and outputs the analog signal to the A/D converter A/D 1 of the CPU 21 as a second angular velocity vy.

The reduction of the low frequency signal component is a two-step process; the primary part of the analog high-pass filter processing operation is performed first by the first and second high-pass filter circuits 27a and 27b, followed by the secondary part of the digital high-pass filter processing operation that is performed by the CPU 21.

The cut off frequency of the secondary part of the digital high-pass filter processing operation is higher than that of the primary part of the analog high-pass filter processing operation.

In the digital high-pass filter processing operation, the value of a time constant (a first high-pass filter time constant hx and a second high-pass filter time constant hy) can be easily changed.

The supply of electric power to the CPU 21 and each part of the angular velocity detection unit 25 begins after the PON switch 11a is set to the ON state (the main power supply is set to the ON state). The calculation of a hand-shake quantity begins after the PON switch 11a is set to the ON state.

The CPU 21 converts the first angular velocity vx, which is input to the A/D converter A/D 0, to a first before-error-correction digital angular velocity signal $BVx_n$ (A/D conversion operation) and calculates a first digital angular velocity signal $Vx_n$ (the first angular error correction processing operation). Next, the CPU 21 calculates a first digital angular velocity $VVx_n$ by reducing a low-frequency component of the first digital angular velocity signal $Vx_n$ (the digital high-pass filter processing operation) to exclude signal elements in the low-frequency component of the first digital angular velocity signal $Vx_n$ includes signal elements that are based on a null voltage and a panning-motion, neither of which are related to hand-shake. Lastly, the CPU 21 calculates a hand shake quantity (a hand shake displacement angle: a first digital displacement angle $Bx_n$) by integrating the first digital angular velocity $VVx_n$ (the integration processing operation).

Similarly the CPU 21 converts the second angular velocity vy, which is input to the A/D converter A/D 1, to a second before-error-correction digital angular velocity signal $BVy_n$ (A/D conversion operation) and calculates a second digital angular velocity signal $Vy_n$ (the second angular error correction processing operation). Next, the CPU 21 calculates a second digital angular velocity $VVy_n$ by reducing a low-frequency component of the second digital angular velocity signal $Vy_n$ (the digital high-pass filter processing operation) to exclude signal elements in the low-frequency component of the second digital angular velocity signal $Vy_n$ includes signal elements that are based on a null voltage and a panning-motion, neither of which are related to hand-shake. Lastly, the CPU 21 calculates a hand shake quantity (a hand shake displacement angle: a second digital displacement angle $By_n$) by integrating the second digital angular velocity $VVy_n$ (the integration processing operation).

Accordingly, the CPU 21 and the angular velocity detection unit 25 use a function to calculate the hand-shake quantity.

The value "n" is an integer that is greater than 1, and indicates a length of time (ms) from the point when the interruption process of the timer commences, (t=1, and see step S12 in FIG. 4) to the point when the latest anti-shake operation is performed (t=n).

Figure 6:
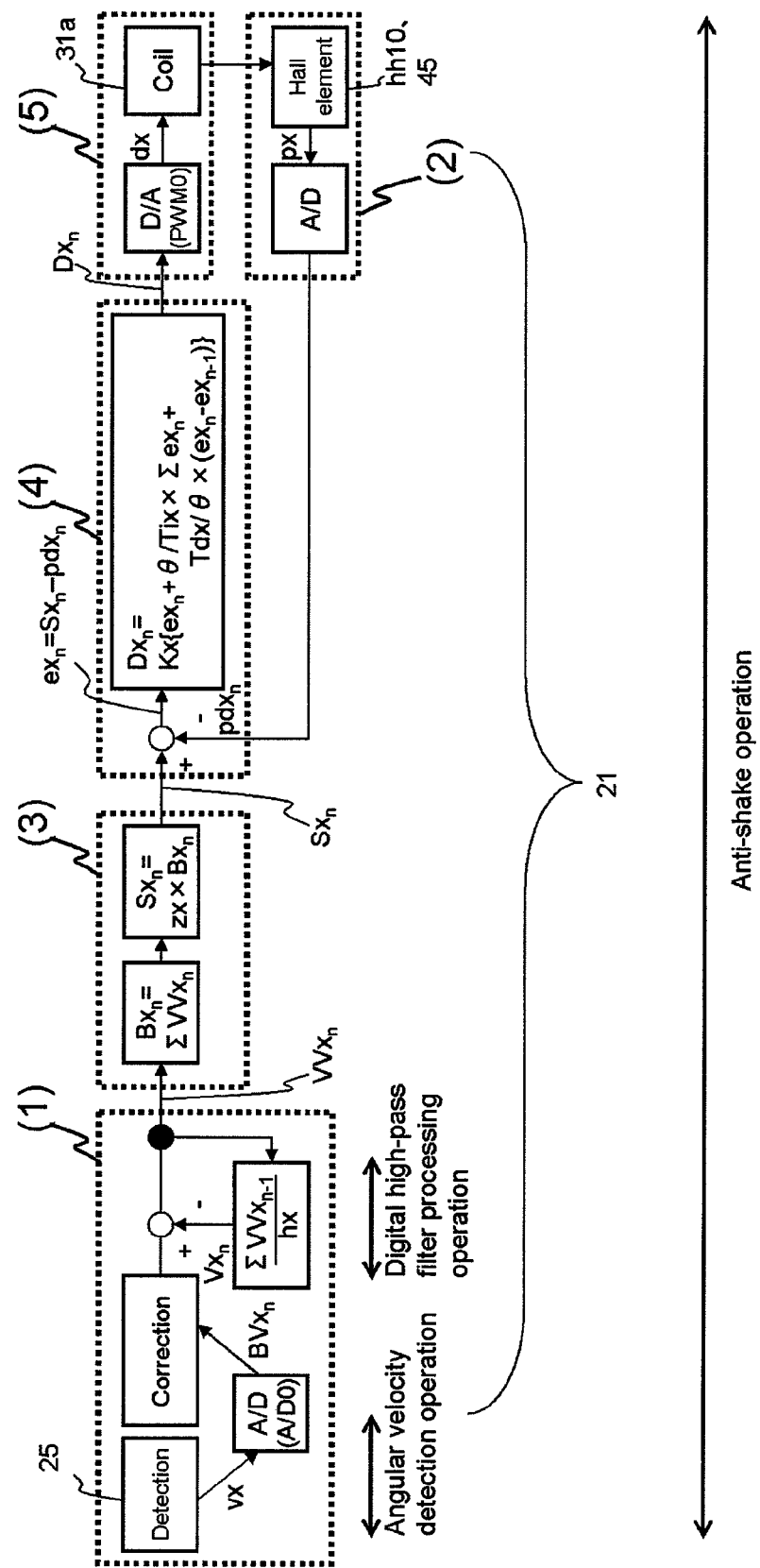
FIG. 6 is a figure that shows the calculations of the anti-shake operation.

In the digital high-pass filter processing operation regarding the first direction x, the first digital angular velocity $VVx_n$ is calculated by dividing the summation of the first digital angular velocity $VVx_1$ to $VVx_{n-1}$ calculated by the interruption process of the timer before the 1 ms predetermined time interval (before the latest anti-shake operation is performed), by the first high-pass filter time constant hx, and then subtracting the resulting quotient from the first digital angular velocity signal $Vx_n$ ($VVx_n = Vx_n - (\Sigma VVx_{n-1}) \div hx$, see (1) in FIG. 6).

In the digital high-pass filter processing operation regarding the second direction y, the second digital angular velocity $VVy_n$ is calculated by dividing the summation of the second digital angular velocity $VVy_1$ to $VVy_{n-1}$ calculated by the interruption process of the timer before the 1 ms predetermined time interval (before the latest anti-shake operation is performed), by the second high-pass filter time constant hy, and then subtracting the resulting quotient from the second digital angular velocity signal $Vy_n$ ($VVy_n = Vy_n - (\Sigma VVy_{n-1}) \div hy$).

In the embodiment, the angular velocity detection operation in (portion of) the interruption process of the timer includes a process in the angular velocity detection unit 25 and a process of inputting process of the first and second angular velocities vx and vy from the angular velocity detection unit 25 to the CPU 21.

In the integration processing operation regarding the first direction x, the first digital displacement angle $Bx_n$ is calculated by the summation from the first digital angular velocity $VVx_1$ at the point when the interruption process of the timer commences, t=1, (see step S12 in FIG. 4) to the first digital angular velocity $VVx_n$ at the point when the latest anti-shake operation is performed (t=n), ($Bx_n = \Sigma VVx_n$, see (3) in FIG. 6).

Similarly, in the integration processing operation regarding the second direction y, the second digital displacement angle $By_n$ is calculated by the summation from the second digital angular velocity $VVy_1$ at the point when the interruption process of the timer commences to the second digital angular velocity $VVy_n$ at the point when the latest anti-shake operation is performed ($By_n = \Sigma VVy_n$).

The CPU 21 calculates the position $S_n$ where the imaging unit 39a (the movable unit 30a) should be moved, corresponding to the hand-shake quantity (the first and second digital displacement angles $Bx_n$ and $By_n$) calculated for the first direction x and the second direction y, based on a position conversion coefficient zz (a first position conversion coefficient zx for the first direction x and a second position conversion coefficient zy for the second direction y).

The coordinate of position $S_n$ in the first direction x is defined as $Sx_n$, and the coordinate of position $S_n$ in the second direction y is defined as $Sy_n$. The movement of the movable unit 30a, which includes the imaging unit 39a, is performed by using electro-magnetic force and is described later.

The driving force $D_n$ drives the driver circuit 29 in order to move the movable unit 30a to the position $S_n$. The coordinate of the driving force $D_n$ in the first direction x is defined as the first driving force $Dx_n$ (after D/A conversion: a first PWM duty dx). The coordinate of the driving force $D_n$ in the second direction y is defined as the second driving force $Dy_n$ (after D/A conversion: a second PWM duty dy).

In a positioning operation regarding the first direction x, the coordinate of position $S_n$ in the first direction x is defined as $Sx_n$, and is the product of the latest first digital displacement angle $Bx_n$ and the first position conversion coefficient zx ($Sx_n=zx \times Bx_n$, see (3) in FIG. 6).

In a positioning operation regarding the second direction y, the coordinate of position $S_n$ in the second direction y is defined as $Sy_n$, and is the product of the latest second digital displacement angle $By_n$ and the second position conversion coefficient zy ($Sy_n=zy \times By_n$).

The anti-shake unit 30 is an apparatus that corrects for the hand-shake effect by moving the imaging unit 39a to the position $S_n$, by canceling the lag of the photographing subject image on the imaging surface of the imaging device of the imaging unit 39a, and by stabilizing the photographing subject image displayed on the imaging surface of the imaging device, during the exposure time and when the anti-shake operation is performed (IS=1).

The anti-shake unit 30 has a fixed unit 30b, and a movable unit 30a which includes the imaging unit 39a and can be moved about on the xy plane.

During the exposure time when the anti-shake operation is not performed (IS=0), the movable unit 30a is fixed to (held at) a predetermined position. In the embodiment, the predetermined position is at the center of the range of movement.

The anti-shake unit 30 does not have a fixed-positioning mechanism that maintains the movable unit 30a in a fixed position when the movable unit 30a is not being driven (drive OFF state).

The driving of the movable unit 30a of the anti-shake unit 30, including movement to a predetermined fixed (held) position, is performed by the electro-magnetic force of the coil unit for driving and the magnetic unit for driving, through the driver circuit 29 which has the first PWM duty dx input from the PWM 0 of the CPU 21 and has the second PWM duty dy input from the PWM 1 of the CPU 21 (see (5) in FIG. 6).

The detected-position $P_n$ of the movable unit 30a, either before or after the movement effected by the driver circuit 29, is detected by the hall element unit 44a and the hall-element signal-processing unit 45.

Information regarding the first coordinate of the detected-position $P_n$ in the first direction x, in other words a first detected-position signal px, is input to the A/D converter A/D 2 of the CPU 21 (see (2) in FIG. 6). The first detected-position signal px is an analog signal that is converted to a digital signal by the A/D converter A/D 2 (A/D conversion operation). The first coordinate of the detected-position $P_n$ in the first direction x, after the A/D conversion operation, is defined as $pdx_n$ and corresponds to the first detected-position signal px.

Information regarding the second coordinate of the detected-position $P_n$ in the second direction y, in other words a second detected-position signal py, is input to the A/D converter A/D 3 of the CPU 21. The second detected-position signal py is an analog signal that is converted to a digital signal by the A/D converter A/D 3 (A/D conversion operation). The second coordinate of the detected-position $P_n$ in the second direction y, after the A/D conversion operation, is defined as $pdy_n$ and corresponds to the second detected-position signal py.

The PID (Proportional Integral Differential) control calculates the first and second driving forces $Dx_n$ and $Dy_n$ on the basis of the coordinate data for the detected-position $P_n$ ($pdx_n$, $pdy_n$) and the position $S_n$ ($Sx_n$, $Sy_n$) following movement.

The calculation of the first driving force $Dx_n$ is based on the first subtraction value $ex_n$, the first proportional coefficient Kx, the sampling cycle $\theta$, the first integral coefficient Tix, and the first differential coefficient Tdx ($Dx_n=Kx \times \{ex_n+\theta \div Tix \times \Sigma ex_n+Tdx \div \theta \times (ex_n-ex_{n-1})\}$, see (4) in FIG. 6). The first subtraction value $ex_n$ is calculated by subtracting the first coordinate of the detected-position $P_n$ in the first direction x after the A/D conversion operation, $pdx_n$, from the coordinate of position $S_n$ in the first direction x, $Sx_n$ ($ex_n=Sx_n-pdx_n$).

The calculation of the second driving force $Dy_n$ is based on the second subtraction value $ey_n$, the second proportional coefficient Ky, the sampling cycle $\theta$, the second integral coefficient Tiy, and the second differential coefficient Tdy ($Dy_n=Ky \times \{ey_n+\theta \div Tiy \times \Sigma ey_n+Tdy \div \theta \times (ey_n-ey_{n-1})\}$). The second subtraction value $ey_n$ is calculated by subtracting the second coordinate of the detected-position $P_n$ in the second direction y after the A/D conversion operation, $pdy_n$, from the coordinate of position $S_n$ in the second direction y, $Sy_n$ ($ey_n=Sy_n-pdy_n$).

The value of the sampling cycle $\theta$ is set to a predetermined time interval of 1 ms.

Driving the movable unit 30a to the position $S_n$, ($Sx_n$, $Sy_n$) corresponding to the anti-shake operation of the PID control, is performed when the photographing apparatus 1 is in the anti-shake mode (IS=1) where the anti-shake switch 14a is set to the ON state.

When the anti-shake parameter IS is 0, the PID control that does not correspond to the anti-shake operation is performed so that the movable unit 30a is moved to the center of the range of movement (the predetermined position).

The movable unit 30a has a coil unit for driving that is comprised of a first driving coil 31a and a second driving coil 32a, an imaging unit 39a that has the imaging device, and a hall element unit 44a as a magnetic-field change-detecting element unit. In the embodiment, the imaging device is a CCD; however, the imaging device may be another imaging device such as a CMOS etc.

The fixed unit 30b has a magnetic unit for driving that is comprised of a first position-detecting and driving magnet 411b, a second position-detecting and driving magnet 412b, a first position-detecting and driving yoke 431b, and a second position-detecting and driving yoke 432b.

The fixed unit 30b movably supports the movable unit 30a in the first direction x and in the second direction y.

When the center area of the imaging device is intersected by the optical axis LX of the camera lens 67, the relationship between the position of the movable unit 30a and the position of the fixed unit 30b is arranged so that the movable unit 30a is positioned at the center of its range of movement in both the first direction x and the second direction y, in order to utilize the full size of the imaging range of the imaging device.

A rectangle shape, which is the form of the imaging surface of the imaging device, has two diagonal lines. In the embodiment, the center of the imaging device is at the intersection of these two diagonal lines.

The first driving coil 31a, the second driving coil 32a, and the hall element unit 44a are attached to the movable unit 30a.

The first driving coil 31a forms a seat and a spiral shaped coil pattern. The coil pattern of the first driving coil 31a has lines which are parallel to the second direction y, thus creating the first electro-magnetic force to move the movable unit 30a that includes the first driving coil 31a, in the first direction x.

The first electro-magnetic force occurs on the basis of the current direction of the first driving coil 31a and the magnetic-field direction of the first position-detecting and driving magnet 411b.

The second driving coil 32a forms a seat and a spiral shaped coil pattern. The coil pattern of the second driving coil 32a has lines which are parallel to the first direction x, thus creating the second electromagnetic force to move the movable unit 30a that includes the second driving coil 32a, in the second direction y.

The second electro-magnetic force occurs on the basis of the current direction of the second driving coil 32a and the magnetic-field direction of the second position-detecting and driving magnet 412b.

The first and second driving coils 31a and 32a are connected to the driver circuit 29, which drives the first and second driving coils 31a and 32a, through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a that corresponds to the value of the first PWM duty dx, and to the second driving coil 32a that corresponds to the value of the second PWM duty dy, to drive the movable unit 30a.

The first position-detecting and driving magnet 411b is attached to the movable unit side of the fixed unit 30b, where the first position-detecting and driving magnet 411b faces the first driving coil 31a and the horizontal hall element hh10 in the third direction z.

The second position-detecting and driving magnet 412b is attached to the movable unit side of the fixed unit 30b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the fixed unit 30b, on the side of the movable unit 30a, in the third direction z.

The second position-detecting and driving magnet 412b is attached to the second position-detecting and driving yoke 432b, under the condition where the N pole and S pole are arranged in the second direction y. The second position-detecting and driving yoke 432b is attached to the fixed unit 30b, on the side of the movable unit 30a, in the third direction z.

The first and second position-detecting and driving yokes 431b, 432b are made of a soft magnetic material.

The first position-detecting and driving yoke 431b prevents the magnetic-field of the first position-detecting and driving magnet 411b from dissipating to the surroundings, and raises the magnetic-flux density between the first position-detecting and driving magnet 411b and the first driving coil 31a, and between the first position-detecting and driving magnet 411b and the horizontal hall element hh10.

The second position-detecting and driving yoke 432b prevents the magnetic-field of the second position-detecting and driving magnet 412b from dissipating to the surroundings, and raises the magnetic-flux density between the second position-detecting and driving magnet 412b and the second driving coil 32a, and between the second position-detecting and driving magnet 412b and the vertical hall element hv10.

The hall element unit 44a is a single-axis unit that contains two magnetoelectric converting elements (magnetic-field change-detecting elements) utilizing the Hall Effect to detect the first detected-position signal px and the second detected-position signal py specifying the first coordinate in the first direction x and the second coordinate in the second direction y, respectively, of the present position $P_n$ of the movable unit 30a.

One of the two hall elements is a horizontal hall element hh10 for detecting the first coordinate of the position $P_n$ of the movable unit 30a in the first direction x, and the other is a vertical hall element hv10 for detecting the second coordinate of the position $P_n$ of the movable unit 30a in the second direction y.

The horizontal hall element hh10 is attached to the movable unit 30a, where the horizontal hall element hh10 faces the first position-detecting and driving magnet 411b of the fixed unit 30b in the third direction z.

The vertical hall element hv10 is attached to the movable unit 30a, where the vertical hall element hv10 faces the second position-detecting and driving magnet 412b of the fixed unit 30b in the third direction z.

When the center of the imaging device intersects the optical axis LX, it is desirable to have the horizontal hall element hh10 positioned on the hall element unit 44a facing an intermediate area between the N pole and S pole of the first position-detecting and driving magnet 411b in the first direction x, as viewed from the third direction z. In this position, the horizontal hall element hh10 utilizes the maximum range in which an accurate position-detecting operation can be performed based on the linear output-change (linearity) of the single-axis hall element.

Similarly, when the center of the imaging device intersects the optical axis LX, it is desirable to have the vertical hall element hv10 positioned on the hall element unit 44a facing an intermediate area between the N pole and S pole of the second position-detecting and driving magnet 412b in the second direction y, as viewed from the third direction z.

The hall-element signal-processing unit 45 has a first hall-element signal-processing circuit 450 and a second hall-element signal-processing circuit 460.

The first hall-element signal-processing circuit 450 detects a horizontal potential-difference x10 between the output terminals of the horizontal hall element hh10 that is based on an output signal of the horizontal hall element hh10.

The first hall-element signal-processing circuit 450 outputs the first detected-position signal px, which specifies the first coordinate of the position $P_n$ of the movable unit 30a in the first direction x, to the A/D converter A/D 2 of the CPU 21, on the basis of the horizontal potential-difference x10.

The second hall-element signal-processing circuit 460 detects a vertical potential-difference y10 between the output terminals of the vertical hall element hv10 that is based on an output signal of the vertical hall element hv10.

The second hall-element signal-processing circuit 460 outputs the second detected-position signal py, which specifies the second coordinate of the position $P_n$ of the movable unit 30a in the second direction y, to the A/D converter A/D 3 of the CPU 21, on the basis of the vertical potential-difference y10.

Figure 4:
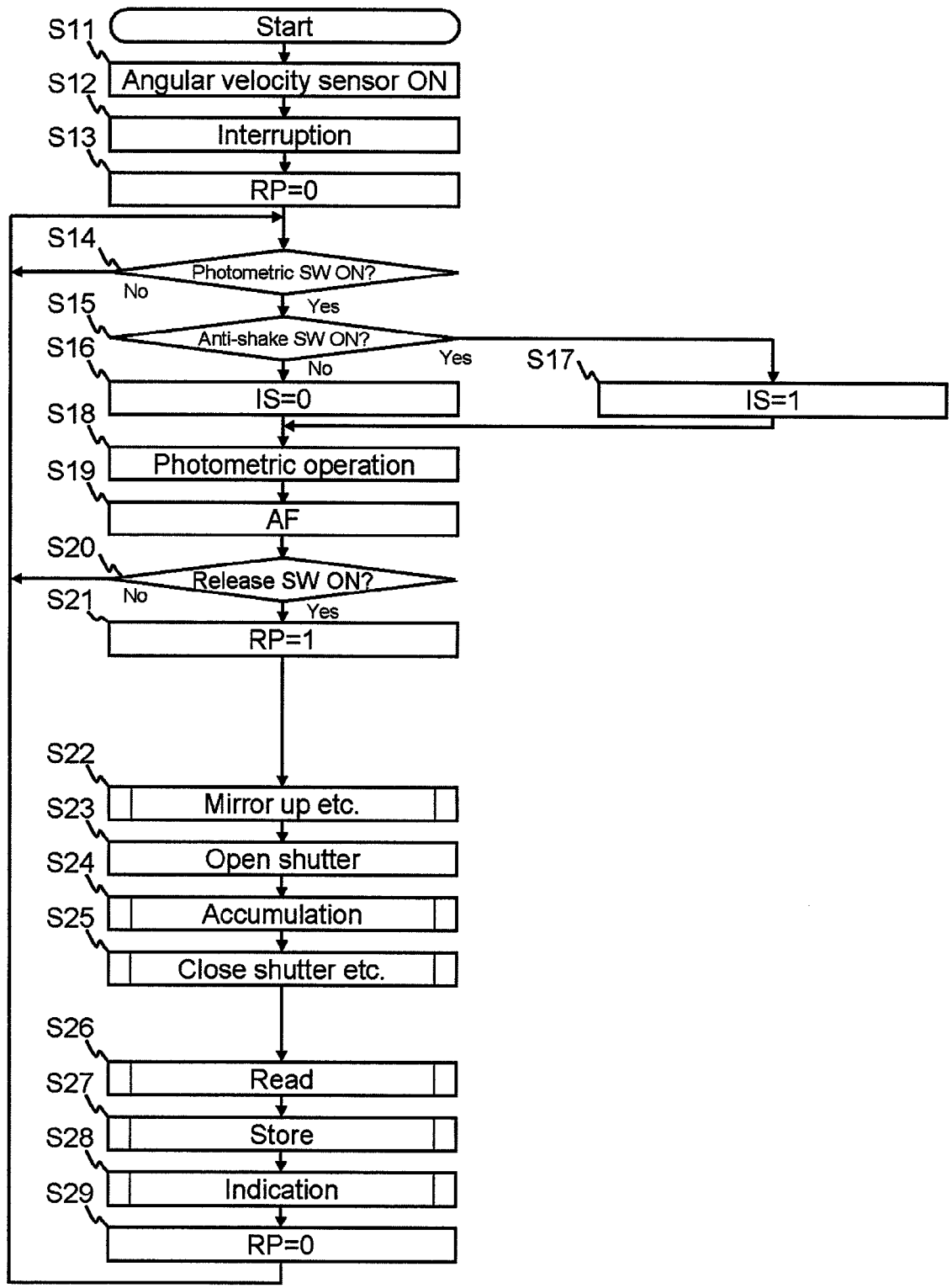
FIG. 4 is a flowchart that shows the main operation of the photographing apparatus.

Next, the main operation of the photographing apparatus 1 in the embodiment is explained by using the flowchart in FIG. 4.

When the photographing apparatus 1 is set to the ON state, the electrical power is supplied to the angular velocity detection unit 25 so that the angular velocity detection unit 25 is set to the ON state in step S11.

In step S12, the interruption process of the timer at the predetermined time interval (1 ms) commences. In step S13, the value of the release state parameter RP is set to 0. The detail of the interruption process of the timer in the embodiment is explained later by using the flowchart in FIG. 5.

In step S14, it is determined whether the photometric switch 12a is set to the ON state. When it is determined that the photometric switch 12a is not set to the ON state, the operation returns to step S14 and the process in step S14 is repeated. Otherwise, the operation continues on to step S15.

In step S15, it is determined whether the anti-shake switch 14a is set to the ON state. When it is determined that the anti-shake switch 14a is not set to the ON state, the value of the anti-shake parameter IS is set to 0 in step S16. Otherwise, the value of the anti-shake parameter IS is set to 1 in step S17.

In step S18, the AE sensor of the AE unit 23 is driven, the photometric operation is performed, and the aperture value and exposure time are calculated.

In step S19, the AF sensor and the lens control circuit of the AF unit 24 are driven to perform the AF sensing and focus operations, respectively.

In step S20, it is determined whether the release switch 13a is set to the ON state. When the release switch 13a is not set to the ON state, the operation returns to step S14 and the process in steps S14 to S19 is repeated. Otherwise, the operation continues to step S21 and then the release sequence operation commences.

In step S21, the value of the release state parameter RP is set to 1.

In step S22, the mirror-up operation of the mirror 18a and the aperture closing operation corresponding to the aperture value that is either pre-set or calculated, are performed by the mirror-aperture-shutter unit 18.

After the mirror-up operation is finished, the opening operation of the shutter 18b (the movement of the front curtain of the shutter 18b) commences in step S23.

In step S24, the exposure operation, i.e., the electric charge accumulation of the imaging device (CCD etc.), is performed. After the exposure time has elapsed, the closing operation of the shutter 18b (the movement of the rear curtain in the shutter 18b), the mirror-down operation of the mirror 18a, and the opening operation of the aperture are performed by the mirror-aperture-shutter unit 18, in step S25.

In step S26, the electric charge that has accumulated in the imaging device during the exposure time, is read. In step S27, the CPU 21 communicates with the DSP 19 so that the image processing operation is performed based on the electric charge read from the imaging device. The image, on which the image processing operation is performed, is stored to the memory in the photographing apparatus 1. In step S28, the image that is stored in the memory is displayed on the indicating unit 17. In step S29, the value of the release state parameter RP is set to 0 so that the release sequence operation is finished, and the operation then returns to step S14. In other words, the photographing apparatus 1 is set to a state where the next imaging operation can be performed.

Figure 5:
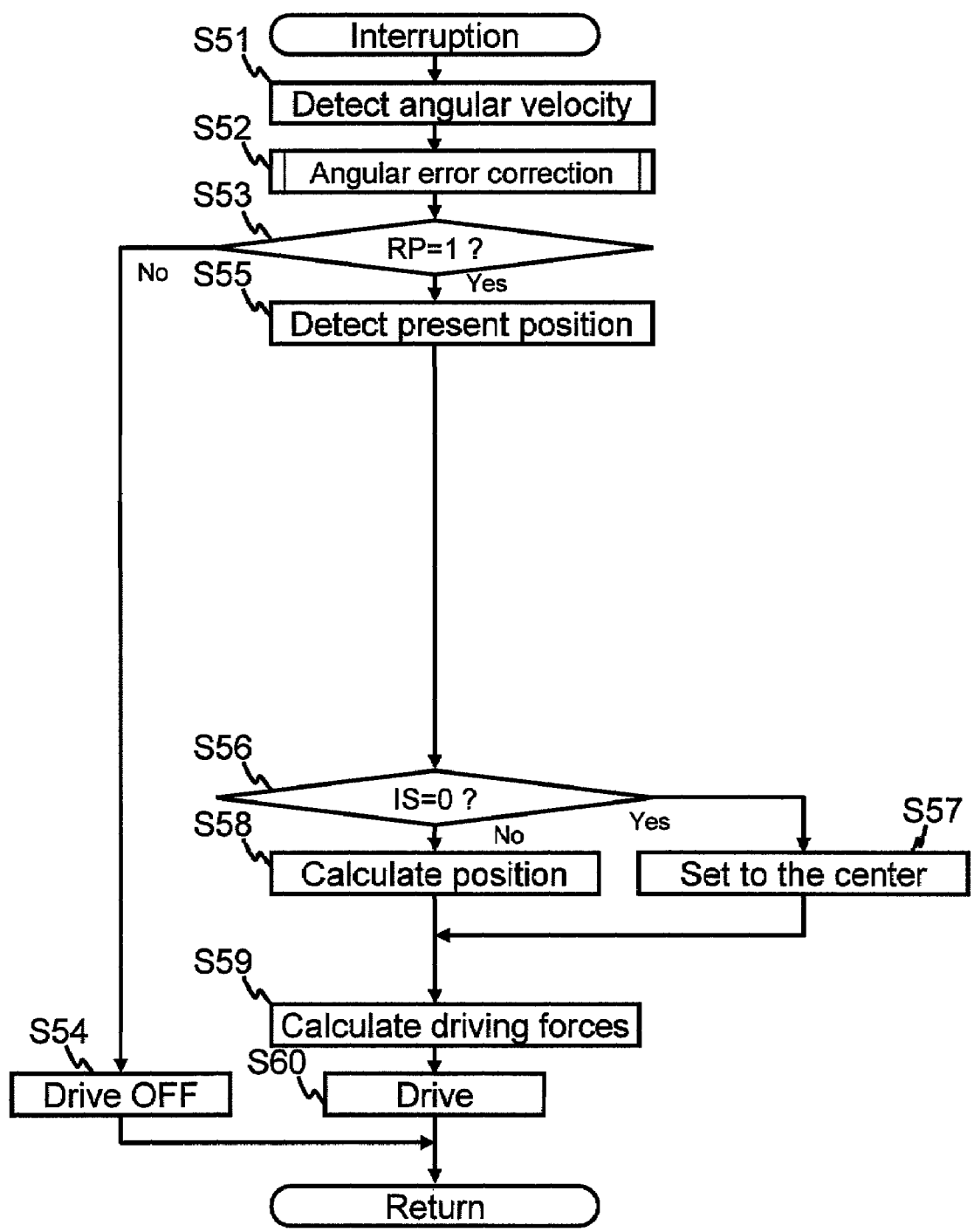
FIG. 5 is a flowchart that shows the detail of the interruption process of the timer.

Next, the interruption process of the timer in the embodiment, which commences in step S12 in FIG. 4 and is performed at every predetermined time interval (1 ms) independent of the other operations, is explained by using the flowchart in FIG. 5.

When the interruption process of the timer commences, the first angular velocity vx, which is output from the angular velocity detection unit 25, is input to the A/D converter A/D 0 of the CPU 21 and converted to the first before-error-correction digital angular velocity signal $BVx_n$, in step S51. The second angular velocity vy, which is also output from the angular velocity detection unit 25, is input to the A/D converter A/D 1 of the CPU 21 and converted to the second before-error-correction digital angular velocity signal $BVy_n$ (the angular velocity detection operation).

In step S52, the first angular error correction processing operation to correct the output error caused by the undesired angle of inclination, resulting from the imperfect installation, of the first angular velocity sensor 26a from the first before-error-correction digital angular velocity signal $BVx_n$, and the second angular error correction processing operation to correct the output error caused by the undesired angle of inclination, resulting from the imperfect installation, of the second angular velocity sensor 26b from the second before-error-correction digital angular velocity signal $BVy_n$, are performed. Next, the first and second digital angular velocity signals $Vx_n$ and $Vy_n$ are calculated. The details of the first and second angular error correction processing operations in the embodiment are explained later by using the flowchart in FIG. 7.

The low frequencies of the first and second digital angular velocity signals $Vx_n$ and $Vy_n$ are reduced in the digital high-pass filter processing operation (the first and second digital angular velocities $VVx_n$ and $VVy_n$).

In step S53, it is determined whether the value of the release state parameter RP is set to 1. When it is determined that the value of the release state parameter RP is not set to 1, driving the movable unit 30a is set to OFF state, or the anti-shake unit 30 is set to a state where the driving control of the movable unit 30a is not performed in step S54. Otherwise, the operation proceeds directly to step S55.

In step S55, the hall element unit 44a detects the position of the movable unit 30a, and the first and second detected-position signals px and py are calculated by the hall-element signal-processing unit 45. The first detected-position signal px is then input to the A/D converter A/D 2 of the CPU 21 and converted to a digital signal $pdx_n$, whereas the second detected-position signal py is input to the A/D converter A/D 3 of the CPU 21 and also converted to a digital signal $pdy_n$, both of which thus determine the present position $P_n$ ($pdx_n$, $pdy_n$) of the movable unit 30a.

In step S56, it is determined whether the value of the anti-shake parameter IS is 0. When it is determined that the value of the anti-shake parameter IS is 0 (IS=0), in other words when the photographing apparatus is not in anti-shake mode, the position $S_n$ ($Sx_n$, $Sy_n$) where the movable unit 30a (the imaging unit 39a) should be moved is set at the center of the range of movement of the movable unit 30a, in step S57. When it is determined that the value of the anti-shake parameter IS is not 0 (IS=1), in other words when the photographing apparatus is in anti-shake mode, the position $S_n$ ($Sx_n$, $Sy_n$) where the movable unit 30a (the imaging unit 39a) should be moved is calculated on the basis of the first and second angular velocities vx and vy, in step S58.

In step S59, the first driving force $Dx_n$ (the first PWM duty dx) and the second driving force $Dy_n$ (the second PWM duty dy) of the driving force $D_n$, which moves the movable unit 30a to the position $S_n$, are calculated on the basis of the position $S_n$ ($Sx_n$, $Sy_n$) that was determined in step S57, or step S58, and the present position $P_n$ ($pdx_n$, $pdy_n$).

In step S60, the first driving coil unit 31a is driven by applying the first PWM duty dx to the driver circuit 29, and the second driving coil unit 32a is driven by applying the second PWM duty dy to the driver circuit 29, so that the movable unit 30a is moved to position $S_n$ ($Sx_n$, $SY_n$).

The process of steps S59 and S60 is an automatic control calculation that is used with the PID automatic control for performing general (normal) proportional, integral, and differential calculations.

Next, the details of the first and second angular error correction processing operations in step S52 in FIG. 5 are explained by using the flowchart in FIG. 7. When the first and second angular error correction processing operations commence, the value of the first before-error-correction digital angular velocity signal $BVx_n$ is set to the first before-correction value TMPX, and the value of the second before-error-correction digital angular velocity signal $BVY_n$ is set to the second before-correction value TMPY, in step S71.

In step S72, the first digital angular velocity signal $Vx_n$ is calculated based on the first before-correction value TMPX, the second before-correction value TMPY, and the second correction coefficient CY ($Vx_n$=TMPX−TMPY×CY). Similarly, the second digital angular velocity signal $Vy_n$ is calculated based on the first before-correction value TMPX, the second before-correction value TMPY, and the first correction coefficient CX ($Vy_n$=TMPY−TMPX×CX).

In the embodiment, it is explained that the movable unit 30a has the imaging device; however, the movable unit 30a may have a hand-shake correcting lens instead of the imaging device.

Further, it is explained that the hall element is used for position detection as the magnetic-field change-detecting element. However, another detection element, an MI (Magnetic Impedance) sensor such as a high-frequency carrier-type magnetic-field sensor, a magnetic resonance-type magnetic-field detecting element, or an MR (Magneto-Resistance effect) element may be used for position detection purposes. When one of either the MI sensor, the magnetic resonance-type magnetic-field detecting element, or the MR element is used, the information regarding the position of the movable unit can be obtained by detecting the magnetic-field change, similar to using the hall element.

Further, the use of the angular velocity detection apparatus (the CPU 21, and the first and second angular velocity sensors 26a and 26b) is not limited to the anti-shake apparatus of the photographing apparatus. For example, the angular velocity detection apparatus may be used for the position detection apparatus of the vehicle navigation system.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2006-276563 (filed on Oct. 10, 2006), which is expressly incorporated herein by reference, in its entirety.

The invention claimed is:

1. An anti-shake apparatus for image stabilizing, comprising:
a first angular velocity sensor that is used for detecting a motion around an axis of a second direction, said second direction being perpendicular to a first direction and an optical axis of a photographing optical system, said first direction being perpendicular to said optical axis;
a second angular velocity sensor that is used for detecting a motion around an axis of said first direction; and
a controller that controls said first and second angular velocity sensors, performs an anti-shake operation based on an output signal from said first angular velocity sensor and an output signal from said second angular velocity sensor, and performs a first angular error correction processing operation and a second angular error correction processing operation in said anti-shake operation;
in said second angular error correction processing operation, an output error caused by an angle of inclination of said second angular velocity sensor being corrected by using a first correction coefficient that is a ratio of a second amplitude to a first amplitude;
in said first angular error correction processing operation, an output error caused by an angle of inclination of said first angular velocity sensor being corrected by using a second correction coefficient that is a ratio of a third amplitude to a fourth amplitude;
said first amplitude being an amplitude of an output value from said first angular velocity sensor when said anti-shake apparatus is in a first motion around the axis of said second direction, but is not in a second motion around the axis of said first direction;
said second amplitude being an amplitude of an output value from said second angular velocity sensor when said anti-shake apparatus is in said first motion, but is not in said second motion;
said third amplitude being an amplitude of an output value from said first angular velocity sensor when said anti-shake apparatus is in said second motion, but is not in said first motion; and
said fourth amplitude being an amplitude of an output value from said second angular velocity sensor when said anti-shake apparatus is in said second motion, but is not in said first motion.

2. The anti-shake apparatus according to claim 1, wherein said inclination of said first angular velocity sensor is indicated by an angle between a detection axis of said first angular velocity sensor and said second direction; and
said inclination of said second angular velocity sensor is indicated by an angle between a detection axis of said second angular velocity sensor and said first direction.

3. The anti-shake apparatus according to claim 1, wherein said first angular error correction processing operation is a calculation of a product of said output signal from said second angular velocity sensor and said second correction coefficient, a result of the product is then subtracted from said output signal of said first angular velocity sensor; and
said second angular error correction processing operation is a calculation of a product of said output signal from said first angular velocity sensor and said first correction coefficient, a result of the product is then subtracted from said output signal of said second angular velocity sensor.

4. An angular velocity detection apparatus comprising:
a first angular velocity sensor that is used for detecting a motion around an axis of a second direction, said second direction being perpendicular to a first direction;
a second angular velocity sensor that is used for detecting a motion around an axis of said first direction; and
a controller that controls said first and second angular velocity sensors, and performs a first angular error correction processing operation and a second angular error correction processing operation;
in said second angular error correction processing operation, an output error caused by an angle of inclination of said second angular velocity sensor being corrected by using a first correction coefficient that is a ratio of a second amplitude to a first amplitude;
in said first angular error correction processing operation, an output error caused by an angle of inclination of said first angular velocity sensor being corrected by using a second correction coefficient that is a ratio of a third amplitude to a fourth amplitude;

said first amplitude being an amplitude of an output value from said first angular velocity sensor when said angular velocity detection apparatus is in a first motion around the axis of said second direction, but is not in a second motion around the axis of said first direction;

said second amplitude being an amplitude of an output value from said second angular velocity sensor when said angular velocity detection apparatus is in said first motion, but is not in said second motion;

said third amplitude being an amplitude of an output value from said first angular velocity sensor when said angular velocity detection apparatus is in said second motion, but is not in said first motion; and said fourth amplitude being an amplitude of an output value from said second angular velocity sensor when said angular velocity detection apparatus is in said second motion, but is not in said first motion.

* * * * *